United States Patent [19]
Honkanen

[11] 3,929,020
[45] Dec. 30, 1975

[54] LEAK-RESISTENT GUAGE

[76] Inventor: Reino Walter Honkanen, 17621 Irvine Blvd., Suite 101, Tustin, Calif. 92680

[22] Filed: May 20, 1974

[21] Appl. No.: 471,683

[52] U.S. Cl. .................................. 73/420; 73/416
[51] Int. Cl.² ........................................ G01L 7/04
[58] Field of Search ................ 73/418, 411–417, 73/300, 299, 420, 431

[56] References Cited
UNITED STATES PATENTS

| | | | |
|---|---|---|---|
| 3,335,609 | 8/1967 | Nelson | 73/414 |
| 3,701,284 | 10/1972 | DeMeyer | 73/416 |
| 3,828,611 | 8/1974 | Shamlian et al. | 73/431 |

*Primary Examiner*—Donald O. Woodiel
*Attorney, Agent, or Firm*—Gilbert A. Thomas

[57] ABSTRACT

A leak-resistent guage which is easily disassembled for repair and maintenance. It is leak-resistent by means of "O" ring seals and a gland innovatively combined to prevent leakage when subject to high external pressures or vacuum. It can be utilized to indicate air pressure by incorporating a measuring instrument of the Bourdon tube type, or other appropriate devices. The guage housing design can also be used to contain other instruments which are required to operate under high external pressures or vacuums without leaking.

12 Claims, 4 Drawing Figures

LEAK-RESISTENT GUAGE

BACKGROUND OF THE INVENTION

1. Field of the Invention

This invention relates to guages for use with underwater diving equipment or in high pressure environment.

2. Description of the Prior Art

Conventional guages used in high pressure or vacuum enviornments such as with underwater diving equipment particularly those used with scuba diving air tanks are usually back-mounted, i.e., the hose connector protrudes from the back of the guage at a 90° angle with the guage housing. This is a disadvantage to the user who must distort the hose to read the air pressure. Most guages which operate under high external pressure, are back-mounted in order to facilitate assembly and sealing of the unit. A number of side-mounted guages have been marketed. They are difficult to assemble and are subject to leakage as the operating pressures increase.

Both back-mounted and side-mounted guages have leakage problems. In order to overcome the possibility of leakage, when subject to high pressures, side-mounted and back-mounted guages have been assembled in which the joints between the housing and connectors, which are the points subject to leakage, are welded or soldered. Another approach has been to encapsulate or pot the entire guage in a suitable resin.

These approaches have been successful in reducing leakage but have resulted in increased costs and a guage that cannot be repaired but must be thrown away and replaced if defective. It is the object of this invention to provide a guage which will be leakproof under conditions of high pressure or vacuum.

It is another object of this invention to provide a guage that can be easily and inexpensively assembled.

It is a further object of the invention to provide a leak-proof easily assembled guage that can be readily disassembled and repaired.

It is still another object of this invention to provide a leakproof, easily assembled and repairable guage that may be used with the various standard connector means.

DESCRIPTION OF THE PREFERRED EMBODIMENT

Figure 1:
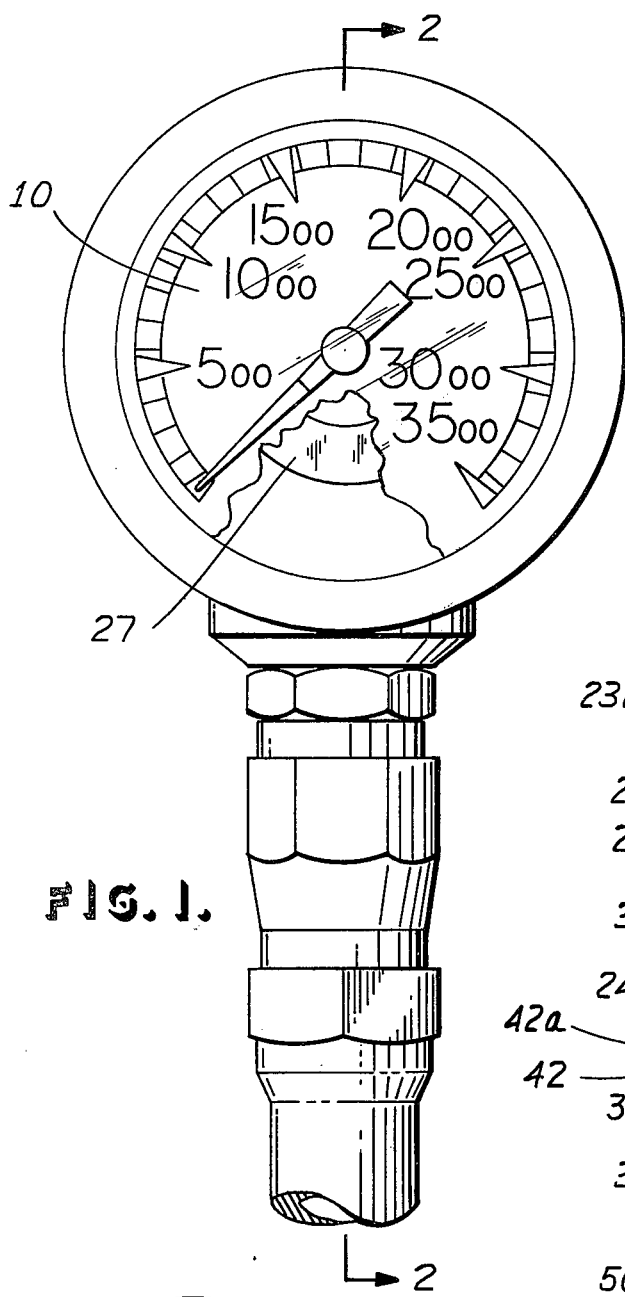
FIG. 1 is a plan view of an embodiment of the invention as an air pressure guage.
Figure 2:
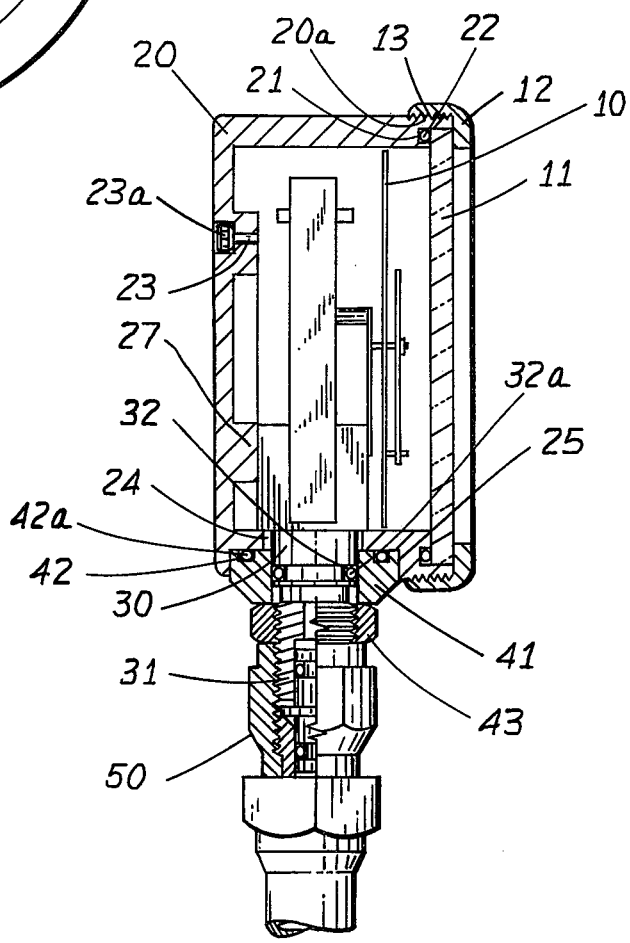
FIG. 2 is a cross-sectioned side view through Line 2—2 showing the features of the invention.
Figure 3:
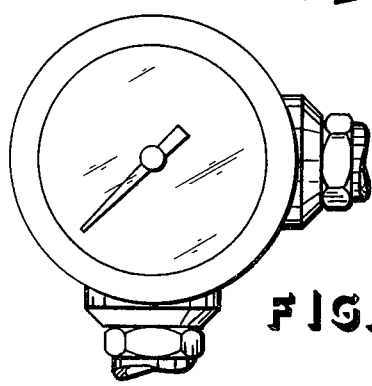
FIG. 3 is an embodiment showing two port openings.

The purpose of the invention is to provide a leak-resistent guage which would have one or more port openings for connection with other devices. FIGS. 1 and 2 illustrates an air pressure guage embodiment in which 10 is the face of a pressure measuring instrument, 11 is a lens of quartz or other transparent material capable of sustaining high external pressures. 12 is a bezel with an interior thread 13 which engages a mating thread 20a on the exterior of housing 20. The housing has an annular groove 21 in which an O ring or other annular sealing means 22 is placed. When bezel 12 is rotated, the lens 11 is forced in sealing engagement with O ring 22 forming a seal which is resistent to leakage at high external pressures or in a vacuum. The housing has a safety vent opening 23, in which, a pressure relief plug 23a is inserted; and a port 24, through which an instrument 30 is connected to an external object to be measured. The measuring instrument 30 has a connector means 31, threaded at the end opposite the instrument and of a length that permits the instrument to be assembled by inserting the connector means 31 through port 24 from the inside and then seating the instrument on an annular ring, insert or raised portion of the housing 27. The housing 20 has a counterbore or recess 25, to receive a gland 41. The instrument connector means has an annular groove 32 located circuferentially between the threaded end and the instrument end, so as to be located in approximately the center of gland 41 when it is doweled into the recess. An O ring or other annular sealing means 32a is mounted in the annular groove. Gland 41 is shaped to fit the recess or counterbore 25 in the housing 20. It contains an annular groove 42 in the upper surface, into which an O ring or other annular sealing means 42a can be placed. A nut 43, engages the threads on connector 31 and when tightened against gland 41 forces the O ring 42a into sealing engagement with the housing. In operation the cooperative action of O rings 32a and 42a effectively seal the connector port of the housing against external vacuum or pressure leaks while O ring 22 seals the face of the housing. The gland 41 which is doweled into the port of the housing and surrounds the connector end of the instrument provides stability to the entire assembly, is actively involved in sealing the instrument by a sealing engagement with O rings 32a and 42, allows the instrument to be installed from inside the housing and assists in preventing rotation of the instrument during installation.

Figure 4:
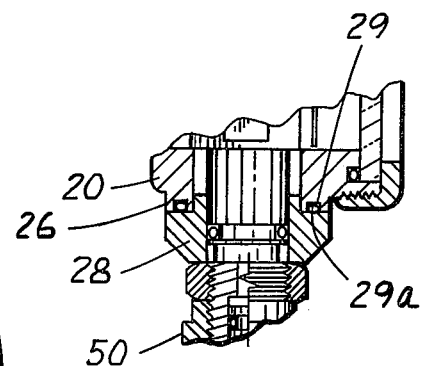
FIG. 4 is a cross-sectioned view of another improvement of the invention as an air pressure guage, showing a housing with a boss.

In FIG. 4 a housing 20 is illustrated in which a boss 26 surrounds the port opening. In this configuration the gland 28 is doweled to the inside of a port opening in the boss. The annular groove 29 with the O ring 29a or other annular sealing means may be on the face of the boss which is in sealing engagement with the gland or on the face of the gland itself. In those cases in which a swivel action is required a swivel fitting 50 may be inserted in the connector end.

Thus having described the invention, what is claimed is:

1. A guage, adopted to contain an instrument for measuring pressurized gas or vacuum, which is subject to leaking in the ambient environment, comprising in combination, a housing having an opening for reading the instrument, one or more ports for connections to be the source to be measured, a threaded portion on the upper outer wall of the housing surrounding the opening, a horizontal surface between the inner and outer surfaces of the housing wall forming the opening, an annular groove to contain an annular sealing means on the horizontal surface, a lens of transparent material, a bezel to contain the lens threaded on the inside circumference to engage the threads on the outer housing wall and hold the lens in sealing engagement with the horizontal surface, an instrument to measure an external source containing a connector means, a portion of which is threaded at the end opposite the instrument, the length of which is dimensioned to permit assembly into the housing from the inside, and a portion adjacent to the instrument which is larger than the port opening to position the instrument inside the housing and prevent pull through, a safety vent and a pressure relief plug in the housing wall, a flat raised portion of the inside wall of the housing opposite the instrument reading opening to position the instrument within the housing during assembly, a counterbored area or recess outwardly surrounding the port opening, an annular gland dimensioned to at least partially be contained in the counterbore or recess and having a smooth bore circumferentially dimensioned to fit the unthreaded portion of the connector means, an annular groove to contain an annular sealing means, on the face of the annular gland, an annular groove in the connector means to contain an annular sealing means, located between the threaded portion and the instrument so as to be in sealing engagement with the gland when the gland is doweled into the recessed area, a nut, threaded to engage the threaded portion of the connector and axially hold the gland in sealing engagement with the counterbore or recessed face of the housing.

2. A guage as in claim 1 in which the annular sealing means is an O ring.

3. A guage as in claim 1 in which the instrument is a pressure measuring instrument of the Bourdon tube type.

4. A guage as in claim 1 in which at least one port opening is in the wall of the housing adjacent to the instrument reading opening.

5. A guage as in claim 1 in which at least one port opening is in the housing wall opposite the instrument reading opening.

6. A guage as in claim 1 in which at least one boss is on the exterior of the housing.

7. A guage as in claim 6 in which the port is formed through the boss on the housing.

8. A guage as in claim 6 in which an annular groove to contain annular sealing means is on the upper face of the boss circumferentially surrounding the port opening so as to engage the face of the gland.

9. A guage as in claim 6 in which the gland is without an annular groove and is doweled into the port opening.

10. A guage as in claim 9 in which the gland is without an annular groove and the upper face of the boss is doweled into the gland.

11. A guage as in claim 6 in which the boss is without an annular groove.

12. A guage as in claim 6 in which the gland has an annular groove to contain an annular sealing means and the upper face of the boss is doweled into the gland.

* * * * *